United States Patent [19]

Straka et al.

[11] Patent Number: 5,712,467
[45] Date of Patent: Jan. 27, 1998

[54] METHOD OF CALIBRATING AND/OR MONITORING A CONTROLLED-TEMPERATURE HEATING DEVICE

[75] Inventors: Derrick Straka, Göppingen; Günter König, Uhingen, both of Germany

[73] Assignee: Zinser Textilmaschinen GmbH, Ebersbach/Fils, Germany

[21] Appl. No.: 630,823

[22] Filed: Apr. 11, 1996

[30] Foreign Application Priority Data

Apr. 12, 1995 [DE] Germany ............... 195 13 951.8

[51] Int. Cl.⁶ .................................................. H05B 1/02
[52] U.S. Cl. .......................... 219/497; 219/481; 219/494; 364/571.03; 374/102
[58] Field of Search .................................. 219/481, 488, 219/501, 494, 505, 506, 497, 499; 374/103, 102; 364/571.01, 601, 571.02, 571.03

[56] References Cited

U.S. PATENT DOCUMENTS

| | | |
|---|---|---|
| 3,435,171 | 3/1969 | Lohest . |
| 3,487,187 | 12/1969 | Martens . |
| 3,581,060 | 5/1971 | Bauer . |
| 4,057,882 | 11/1977 | Waldron ................................ 73/1 F |
| 4,840,494 | 6/1989 | Horn ...................................... 374/1 |
| 4,891,497 | 1/1990 | Yoshimura ........................... 219/241 |
| 4,901,257 | 2/1990 | Chang et al. ..................... 364/571.01 |
| 5,144,814 | 9/1992 | Gaudette ............................... 62/223 |
| 5,531,377 | 7/1996 | Thayer et al. ....................... 374/128 |
| 5,552,998 | 9/1996 | Datta ................................ 364/571.01 |
| 5,553,939 | 9/1996 | Dilhac et al. .......................... 374/1 |

FOREIGN PATENT DOCUMENTS

| | | |
|---|---|---|
| 1 901 902 | 10/1969 | Germany . |
| 21 08 825 | 9/1972 | Germany . |
| 25 17 731 | 11/1976 | Germany . |
| 36 21 397 | 2/1987 | Germany . |
| 43 19 652 | 12/1994 | Germany . |
| 43 19 652 A1 | 12/1994 | Germany . |
| 1354056 | 7/1972 | United Kingdom . |
| 1379943 | 8/1972 | United Kingdom . |
| 1 354 056 | 5/1974 | United Kingdom . |
| 1 379 943 | 1/1975 | United Kingdom . |

OTHER PUBLICATIONS

Adaptive Pid–Regler Für Thermische Prozesse, Billmann and Rupp, Kassel 1989.

"Adaptive Pid–Regler Fur Thermische Proprozesse", Billmann et al, Automatisierungstechnische Praxis atp 31 (1989, Oldenbourg Verlag, 4 pp.

*Primary Examiner*—Mark H. Paschall
*Attorney, Agent, or Firm*—Herbert Dubno

[57] ABSTRACT

A heated galette is provided with a heating unit and a temperature sensor connected in a control circuit with the heating unit to maintain a certain temperature of the surface of the galette on which a synthetic yarn is guided. The control circuit is disconnected periodically or intermittently so that the heating unit can be heated independently of the feedback control provided by the control unit. Upon the heating unit attaining an equilibrium with temperature, a first actual value temperature is measured and a difference is obtained from a setpoint temperature corresponding to a given control ratio and a signal representing the difference is generated. Utilizing this system, it is possible to detect failure of the temperature sensor and/or the heating unit or inappropriate positioning of the temperature sensor.

6 Claims, 1 Drawing Sheet

METHOD OF CALIBRATING AND/OR MONITORING A CONTROLLED-TEMPERATURE HEATING DEVICE

FIELD OF THE INVENTION

Our present invention relates to a method of or process for the calibration and monitoring of a controlled-temperature heating device, especially a heated galette of a spinning-plant machine for the production of synthetic yarn. The invention also relates to a controlled-temperature heating device and particularly such a galette as is used for machines in spinning plants. In particular, the invention relates to devices of the latter type which are controlled by the process or method of the invention.

BACKGROUND OF THE INVENTION

In spinning plant machines for the production of synthetic yarns, especially stretch-winding machines, it is necessary to maintain the temperature of the surfaces of the galette which come in contact with the yarn, constant within certain tolerances. For this purpose, as a rule, at least one temperature sensor is provided for detecting the temperature of the galette surface and which generates a signal which is utilized in a control circuit for the temperature. The control circuit may regulate energization of a heating element on the galette or the heat transfer from such a heating element or heating unit external to the galette, to the latter so that a desired setpoint temperature of the galette can be maintained constant within the desired boundaries or limits.

Galettes of a type having a heater and which can be controlled are described, for example, in U.S. Pat. Nos. 3,581,060, 3,487,187 and 3,435,171.

There are numerous possibilities for arrangements of the temperature sensors of such galettes. For example, a temperature sensor can be embedded in the shell of a galette (German open application DE-OS 21 08 825). A problem with this system is that only one location on the periphery of the galette is sensed so that spots of different temperature on the galette surface cannot be detected.

Annular temperature sensors can be integrated in a groove in an inner surface of the galette shell (German open application DE-OS 19 01 902) but these have the drawback, like the temperature sensors embedded in the galette shell, that the sensor signal must be delivered from the rotating part to a stationary part.

In order to minimize the cost, complexity and maintenance requirements of the control systems, it is desirable to use stationary temperature sensors. Such temperature sensors can extend into a concentric groove in the galette toward the axis of rotation thereof, or can be provided in a groove parallel to the axis in the heating unit disposed within the galette. In such cases there is a spacing between the regions of the galette shell on which the yarn is guided and at which the temperature should be measured and the groove at which the sensor is provided.

As a result of the temperature drop in the galette shell inwardly of the surface and the thermal inertia of the galette itself, measurements taken in this manner tend to differ from the actual temperature at the yarn-contacting surface of the galette. Another disadvantage of this system is that the air-filled space between the galette body and the temperature sensor impedes transfer since air acts as an insulator between the galette and the temperature sensor. As a consequence, the sensor does not accurately detect the temperature in the region of the yarn or, stated otherwise, the temperature detected by the sensor deviates from the actual temperature at the surface of the galette in contact with the yarn.

The effect of air as an insulator can be overcome according to German open application DE-OS 25 17 31 by filling the gap at least during operation of the galette with a liquid heat transfer medium. The remaining detrimental effects, however, cannot be overcome in this manner and it has been found that the use of a liquid heat-transfer medium in the gap can involve problems in construction of the system.

To provide compensation for these effects, it is known, at time-spaced intervals, for example at least once daily, to compare the temperature detected by the temperature sensor, while it is connected in the closed-control loop, with an actual temperature measured at the surface of the galette and to utilize the difference, in accordance with its sign, $\pm$, as a correction value in the closed-control loop.

The measurement of the surface temperature of the galette, however, poses problems in this case. Indeed, the measurement of the surface temperature must be obtained with precision on the rotating galette since measurements of the galette at standstill can be affected by different ambient temperatures, thermal conductivities and the like which can give rise to intolerable errors in the measurement.

Primarily external measurement devices are used as a rule, and can have temperature sensors which can be brought into contact with the rotating galette surface, thereby subjecting the temperature sensor to mechanical error. It is common for a temperature sensor for this purpose to be useful only about 1000 to 1500 times, i.e. for 1000 to 1500 measurements. As a consequence, this technique has been found to be costly. Apart from the high cost, external temperature measurements are extremely time-consuming. This is especially the case with spinning machinery having a number of work stations, for example 150 work stations, each of which can have three galettes. The time-consuming operations are detrimental to the productivity of the spinning plant.

The aforedescribed drawbacks are not overcome even by the usual initial calibration of the machine before it is supplied to the customer. For this calibration, the aforedescribed calibration process utilizing an external temperature measuring device is usually also implied.

OBJECTS OF THE INVENTION

It is the principal object of the present invention to provide an improved process or method of calibrating and monitoring a controlled temperature heating device, especially a heated galette of a spinning plant for the production of plastic fibers which eliminates the need for using external temperature measurement devices or sensors and nevertheless provides a satisfactory precision for the calibration or monitoring of the heating device.

It is another object of the invention to provide a controlled-temperature heating device especially a heated galette for a spinning machine plant, which facilitates the practice of the improved process or method of the invention.

SUMMARY OF THE INVENTION

These objects and others which will become apparent hereinafter can be attained in a method of calibrating and monitoring a temperature-controlled heating device, especially a heated galette of a spinning-plant machine in the production of synthetic yarn in which the method comprises the steps of:

(a) disconnecting a temperature-control circuit from a heating unit of the heating device for monitoring thereof and energizing the heating unit with a constant first control ratio ($s_o$);

(b) upon the heating unit attaining an equilibrium temperature with a heated part of the heating device, measuring a first actual-value temperature ($T_m(t_m)$) of the heated part with a temperature sensor;

(c) determining a difference ($\Delta T$) of the measured first actual-value temperature ($T_s(t_m)$) of the heated part from a set-point temperature ($T_s(t_m)$) corresponding to the constant first control ratio ($s_o$) and generating a signal representing the difference.

The invention is based upon the fact that high precision and reliability can be obtained with respect to calibration of the heating unit integrated in the heating device by providing a constant setting ratio after reaching an equilibrium state for a constant construction of the galette and machine environment, in obtaining a desired temperature of the galette. In order to ensure a constant setting ratio, the control circuit is separated from the device during the normal operation thereof.

The setting ratio s, in this context, is defined as a quotient of the value of the instantaneous setting or setpoint S and the maximum value of the setting parameter $S_{max}$, given in percent.

The true relationship between the control or setting ratio and the surface temperature of the heating device, especially the surface temperature on the surface of the galette, can be effected in the above described manner as a result of a single measurement operation.

The development of the surface temperature/control ratio characteristic is required, however, for each type of heating unit and for each type of spinning-plant machine but need be established only once for each case.

A requirement for the correct function of the heating unit of the heating device is that for each type of heating unit or spinning-plant machine, for the control ratio $s_0$ initially determined, the deviation difference $\Delta T$ is determined from the characteristic for this control ratio from the temperature detected by an integrated temperature sensor, with respect to the setpoint temperature and gives rise to a signal.

In one embodiment of the invention, upon detection of an impermissibly high deviation $\Delta T$, a failure signal is generated which, as in the case of a defective temperature sensor, can indicate the condition, namely, the fact that compensation of the deviation is no longer possible or sensible in the controlled operation of the device. The failure signal thus can indicate to service personnel or an operator the need for replacement of the temperature sensor.

When a temperature sensor is provided in an air gap as has previously been described, an impermissible deviation can occur only when the actual detected deviation is greater than a theoretical or empirical deviation for the particular machine or machine type which can exceed the maximum permissible tolerance of the characteristic of the temperature sensor and/or the permissible tolerances in the mounting of the temperature sensor. In that case the generation of a failure signal is even more important. According to the invention, the maximum permissible deviation of a plurality of multiplicity of work stations of a machine can form an average value and this average value must be exceeded before the failure signal is transmitted. This system has the advantage that environmental influences can be minimized.

When, for example, for a certain type of machine with a constant control ratio of s=50%, a surface temperature of the galette reaches 220° C. and the temperature sensor, dependent on permissible variations in its positioning in the device, can indicate actual or measured temperatures of 210° C. to 230° C., this tolerance range can constitute the range of tolerance in the maximum permissible value above which a defect of the sensor will be signaled.

With the process of the invention, a first-time monitoring of the heating device of the spinning plant machine after mounting or assembly can be used as a basis for determining the probability of the occurrence of a defective heating device relative to the probability of detection of a defective temperature sensor which may require replacement of the temperature sensor in the galette. It will be self-understood that monitoring of the function of the sensor or the function of the sensor/heating unit system can occur optionally at other times or at predetermined intervals.

When the temperature sensor during the process of the invention detects a temperature value within the permissible tolerances, the temperature deviation serves as a correction value for the measured actual value. With the system of the invention, by the establishment of a single parameter, namely temperature deviation with an open control cycle, and the establishment of the need for replacement of the temperature sensor or a particular other component as need arises, the correction of the controlled heating unit when the control circuit is restored can be carried out with greater reliability than has hitherto been the case.

The process of the invention also allows simplification in initial monitoring or calibration of the heating unit of the spinning plant machine. Since a defect in the temperature sensor or an impermissible position in which the temperature sensor has been located, or even a defect in the heating device of the heating unit itself can be ascertained in this manner, overall reliability is improved. Whether the defect discovered is a defect in the heating unit and/or a defect in the temperature sensor cannot be distinguished in the previously-described embodiments of the invention.

According to a further feature of the invention, therefore, upon detection of an impermissible temperature variation or the development of the failure signal as described, the control ratio is altered to a second constant value, preferably to zero and depending upon a comparison of the slope of the measured characteristic of the actual temperature ($T_m(t \geq t_1)$) and of the setpoint temperature characteristic $T_s$, after the change in the control ratio at one point or an average of slopes, differs in a given time interval, thereby signaling whether the defect is a defect in the heating unit or a defect in the temperature sensor.

In an embodiment of the invention, after a predetermined time interval following the control ratio change, the integrated temperature sensor measures actual values of the temperature. The temperature between the first actual temperature difference (equilibrium state at the first constant control ratio $s_0$) and the second actual value of temperature (measured after a predetermined time interval following the application of the second constant control ratio) is determined. This difference in actual temperature values can be compared with a difference in setpoint temperature values and, depending upon the deviation can be concluded to arise from a defect in the heating unit (resulting in the issuance of a heating unit failure signal) or in the temperature sensor (resulting in the issuance of the temperature sensor failure signal).

The setpoint difference corresponds, for a given machine type, only to the given difference between the first setpoint value $s_0$, corresponding to the temperature setpoint and the temperature setpoint arising after the predetermined time interval. In other words for a given machine type it is possible to determine, with a one-time measurement, the value by which the instantaneous measured surface temperature is reduced when, after attainment of an equilibrium temperature with a constant first control ratio, the heating unit is energized with a constant lower second control ratio (preferably by cutting off energization altogether, and the actual temperature is measured after a predetermined interval following the control ratio change.

The invention is based upon the discovery that, in the case in which a constant predetermined control ratio results in attainment of a higher temperature than can be expected for the type of device which has been installed, a greater cooling down should be provided, i.e. a greater temperature difference should be sustained so that the time for a control ratio change should be altered to permit a greater temperature gradient between the heated surface and the environment.

When, utilizing the integrated temperature sensor, an actual difference is detected which corresponds to the expected setpoint difference or differs from it only within permissible tolerances, it can be concluded with a high degree of reliability that there is no defect in the heating unit, but rather that any defect which results from a failure signal, lies in the temperature sensor.

By contrast, when the actual difference lies outside the permissible tolerances, it can be assumed with a high degree of reliability that the heating unit is defective since the variation of the actual temperature difference practically assures that the heating surface with a predetermined constant control ratio has not achieved the correct corresponding temperature.

In general terms, a defective temperature sensor is associated with a slope of the temperature actual value with an increase in the control ratio or a decrease thereof (either at a given point or range or upon averaging of the slope over a certain range) which is not outside permissible tolerances for the temperature setpoint characteristic as determined once for the type of apparatus. In other cases one can conclude with a high degree of assurance that a defective heating unit is the cause of the deviation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
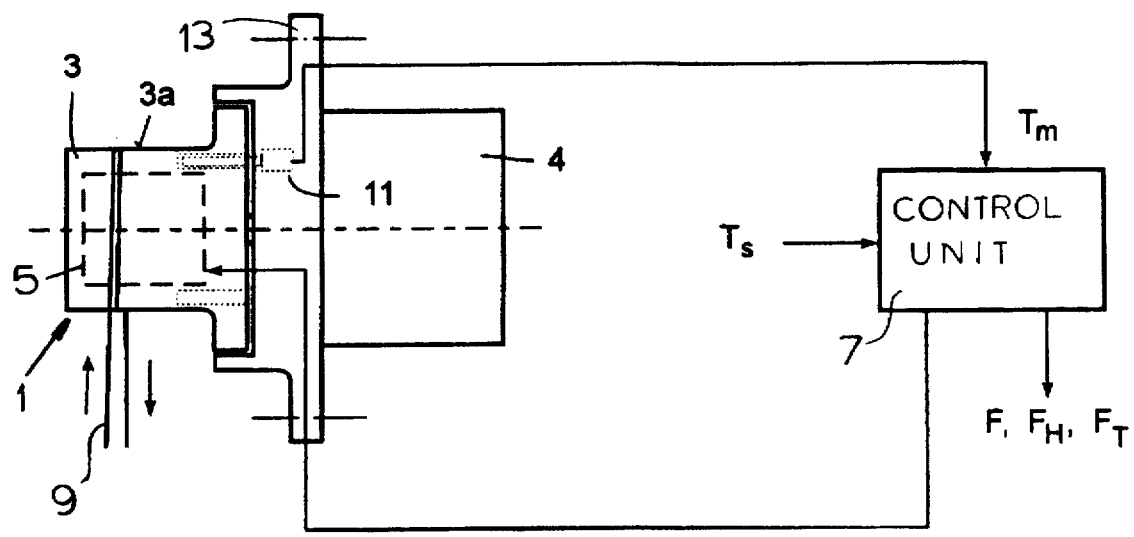
FIG. 1 is a schematic diagram of a heated galette of a spinning plant machine not otherwise illustrated and provided with a control system to which the process of the invention applies.

FIG. 1 shows a heated galette assembly 1 of a spinning plant machine not otherwise illustrated, especially for the production of synthetic yarn, the assembly including a heatable galette 3 which is rotatably driven by a drive 4.

Within the galette 3, a heating unit 5, shown in broken lines, is provided, the heating unit can be a heating coil or some other resistive heating element or an inductive heating unit. The heating element 5 is energized through a control unit 5 forming part of a control circuit with the heating unit having a setpoint value S of the temperature. The control ratio can be defined as a value s equal $S/S_{max}$ where $S_{max}$ is the maximum value of the setpoint temperature which also represents the highest temperature which can be generated by the control unit on the surface 3a of the galette 3.

The temperature of the surface 3a is selected as that which is necessary for the heating or treatment of a yarn 9 looped around the galette 3.

The control system further comprises, for the galette assembly 1, a temperature sensor 11 which may be fixed in a housing 13 of the assembly 1 with respect to which the galette 3 is rotatable. The temperature sensor 11 can be inserted in a groove in this housing which is concentric with the galette so that it extends into the galette from its rear end.

The sensor signal from the temperature sensor 11 is fed at $T_m$ to the control unit 7 so that the latter functions in the normal way as a feedback controller for the temperature of the surface 3a of the galette. When the control circuit is connected, i.e. the control unit 7 energizes the heating unit 5 and responds to the measured temperature of the sensor 11 with a feedback control, any deviation in the temperature at the surface 3a detected by the sensor 11 results in a response at the control unit 7 to adjust the energization of the heating unit 5 to restore the setpoint temperature corresponding to control parameter S. In this case, the setting S or the control ratio s is so varied as a function as the measured value of the actual temperature that the temperature difference between the temperature setpoint $T_s$ supplied to the control unit 7 has an input, and the measured temperature $T_m$ is reduced to zero.

Since the temperature $T_m$ detected by the temperature sensor 11 as a rule is slightly below the temperature $T_s$ at the surface 3a of the galette 3 because of the location of the temperature sensor at a slight distance from this surface, the control unit 7 supplies a corresponding correction for the measured temperature value. For example, a correction value, with the correct sign, is algebraically added to the measured temperature before the comparison between the measured temperature $T_m$ and the setpoint temperature $T_s$ is carried out.

Figure 2:
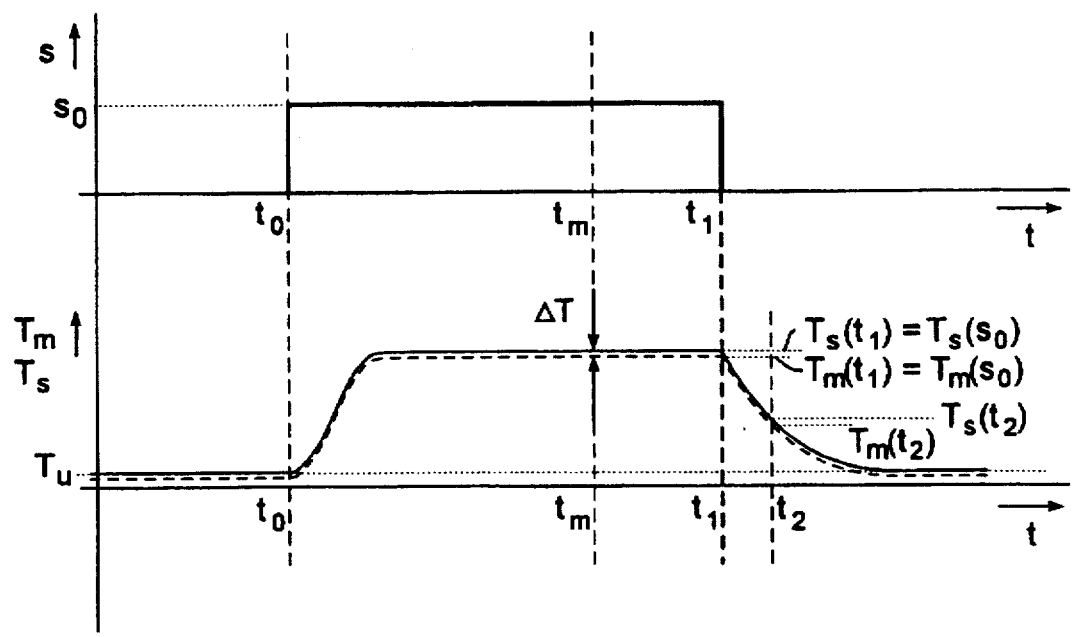
FIG. 2 is a diagram of the control ratio characteristic and the characteristics of the setpoint and actual temperatures to illustrate the process of the invention, the magnitudes of the temperature and control range being plotted along the ordinate against time along the abscissa.

The calibration or monitoring operation also effected by the control unit 7 is described in connection with the diagrams of FIG. 2.

At a time $t_0$, the control unit 7 operates the heating unit 5 at a constant control ratio $s_0$ of, for example, 50%. It is unimportant for the function according to the invention whether the control ratio $s_0$ as is shown in FIG. 2, is raised in a jump from zero to 50% or to some optional other value or is raised slowly to the desired constant setpoint $s_0$.

It is only necessary that the control ratio (e.g. after a transition time) have reached the constant value $s_0$ and the closed control loop be disconnected, i.e. the control ratio $s_0$ be held constant independently of the actual temperature measured by the temperature sensor 11. Preferably the drive 4 is activated during this period so that any negative effect on the measurement which may result from a stationary galette will be excluded.

After equilibrium is obtained under these circumstances, i.e. with constant $s_0$ and the temperature sensor 11 is disconnected, at time $t_m$ (FIG. 2) the actual temperature value $T_m(t_m)$ is measured (i.e. the temperature sensor 11 is reconnected) and fed to the control unit 7.

As is apparent from the diagrams in FIG. 2, the characteristic of the actual temperature $T_m$ detected by the sensor 11 may lie below the setpoint temperature $T_s$ at the surface 3a of the galette. To illustrate this the characteristic of the setpoint temperature has been shown in a solid line in FIG.

2 and the characteristic of the galette temperature has been shown in broken lines.

Since it has been found that for a given type of galette assembly or correspondingly a given type of spinning plant machine, the energization of the heating unit 5 with a constant control ratio has only small deviations in the temperature at the surface 3a of the respective galette, each type of machine only requires a single measurement of the surface temperature $T_s$ as a function of the control ratio to establish the characteristic for all of the machines of the same type. Of course it is desirable that the determination of the characteristic and thus that the process be carried out either without a yarn or with the same yarn so that there will be uniform heat transfer from the galette.

Assuming that the heating unit 5 is functioning correctly, with the measurement of a temperature deviation $\Delta T=T_m(t_m)-T_s(t_m)$ a correction value can be established with which in the controlled operation of the heating unit in response to the actual temperature $T_m$ detected by the sensor can be corrected with an appropriate sign. In this fashion, unavoidable tolerances in the positioning of the temperature sensor in the air gap or the deviations resulting therefrom of the detected actual temperature from the instantaneous surface temperature can be obtained and compensated. The correction values can be stored in the control unit 7.

If it is previously determined at which constant control ratio $s_0$ and therewith the surface temperature of the galette 3 at which this measurement should be taken, it is only necessary to set the control unit 7 for a single point of the characteristic $T_s(s_0)$ corresponding to the machine type which is being used. The determined deviation $\Delta T$ can then be used as a correction value in the temperature range around the point $T_m(s_0)$. It is desirable to effect this calibration of the heating unit at a temperature $T_s$ which lies in a range which is relatively close to the working temperature during the synthetic yarn production process, for example a temperature $T_s$ of about 220° C. or a corresponding control ratio $s_0$.

Naturally, the deviation $\Delta T$ can also be obtained at a plurality of points (temperature or control ratio points) and stored in the control unit 7 in the form of discrete measurement points or an analytical function approximating same.

Furthermore, from the aforedescribed measurement of the deviation $\Delta T$, given the correct functioning of the heating unit 5, the correct functioning and original position setting of the temperature sensor can be checked. For this purpose, a range of permissible deviations $\Delta T$ of a certain machine type can be determined, especially as a function of permissible tolerances in the positioning of the sensor 11 in an air gap. If it is determined for a certain machine type, for example, that with a correctly functioning temperature sensor the detected actual-value temperature will vary in the range of ±2° to 10° C. from the actual surface temperature of the galette, upon a determination of a deviation outside this range by the process described, it can be concluded that the temperature sensor used for the particular heating unit is defective and must be replaced.

Even when a correct functioning of the remaining elements (other than the sensor) cannot be presupposed, it can be automatically concluded that one or more elements of the control circuit (separated out for the measurement) may not be correctly functioning.

Since, in practice, it has been found that in practically all cases of an operating failure, either the sensor 11 or the heating unit 5 is defective, it can be concluded with high probability that a detected defect will lie in one or the other of these components.

We will describe below how, in accordance with a preferred embodiment of the invention, it can be determined in accordance with the invention in which of these two components a defect can reside.

After carrying out the aforedescribed process (FIG. 2), the control ratio s jumps at time $t_1$ to a value of 0%. After a predetermined time interval $\Delta t=t_2-t_1$ or at time $t_2$ the actual temperature $T_m(t_2)$ is measured and the difference $\Delta T_{m12}=T_m(t_m)-T_m(t_2)$ is obtained. It is self-understood that at the point in time $t_1$ the temperature $T_m(t_1)$ can be measured again; this is, however, not necessary for a constant control ratio $s_0$ since it gives: $T_m(t_m)=T_m(t_1)$.

The actual-value difference $|\Delta t_{m12}|$ is then compared with a setpoint difference $|\Delta t_{s12}|$ derived from the difference $|T_s(t_1)-T_s(t_2)|$. In other words the average slope of the falling actual temperature curve is compared with that of the falling setpoint temperature curve (starting from the correct temperature value $T_s(t_1)$).

From the deviation of the average slopes it is possible to determine whether a defect lies in the heating unit or in the temperature sensor.

For this purpose the invention is based upon the fact that the average slope at a higher starting temperature $(T_s(t_1))$ is greater than at a lower starting temperature. This is because of the greater temperature gradient between the surface 3a of the heated galette 3 and the maintained ambient temperature $T_u$. Since machines of the type with which the invention is concerned practically always require a controlled temperature environment to assure optimum and constant product quality, the temperature $T_u$ can be assumed to be constant. In the simplest case the control unit can thus be provided with a single value for the setpoint difference $|\Delta t_{s12}|$ for a given starting temperature $T_s(t_1)$ and a given ambient temperature $T_u$ for the measurement interval $\Delta t=t_2-t_1$ for a given machine type.

If the determined actual difference lies, for example, below the setpoint difference, one can conclude that the temperature of the surface 3a of the galette 3 at the constant control ratio $s_0$ was lower that the setpoint value which was to be achieved and hence that the heating coil was defective.

Correspondingly, when the actual difference is substantially the same as the setpoint difference, but an impermissibly high temperature deviation $\Delta T$ is nevertheless obtained, one must conclude that the temperature sensor 11 is defective.

Since, for this comparison, the slopes of the descending curves of the actual temperature measured by the sensor 11 and the setpoint temperature are the measurements used, it will be self-understood that, instead of the determination of the temperature differences before and after a time interval $\Delta t$, a certain temperature value reached by both curves can be selected and the time determined within which this temperature is reached. In this case the mean slope is greater as the measured time interval is shorter.

In another embodiment of the invention, the maximum slope can be determined by a continuous detection of the course of the temperature curve after a change in the control ratio $s_0$. While a change in the control ratio $s_0$ to 0% has been illustrated, the invention can also operate with an arbitrary change in the control ratio $s_0$ which has been constant to time $t_1$ to some optional other value, for example with an increase in the control ratio. In this case, however, in evaluating the slope of the setpoint temperature course or the actual temperature characteristic, it must be recalled that a greater slope signifies an actual temperature value at time $t_1$ which was originally too low.

We claim:

1. A method of monitoring a temperature controlled heating device in the form of a heated galette of a spinning-plant machine in the production of synthetic yarn, said method comprising the steps of:

(a) disconnecting a temperature-control circuit from a heating unit of said heating device for monitoring thereof and energizing said heating unit with a constant first control ratio ($s_0$);

(b) upon said heating unit attaining an equilibrium temperature with a heated part of the heating device, measuring a first actual-value temperature ($T_m(t_m)$) of the heated part with a temperature sensor;

(c) determining a difference ($\Delta T$) of the measured first actual-value temperature ($T_s(t_m)$) of the heated part from a setpoint temperature ($T_s(t_m)$) corresponding to said constant first control ratio ($s_0$) and generating a signal representing said difference;

generating a failure signal (F) upon a detection of magnitude of said difference ($\Delta T$) exceeding a predetermined maximum permissable value thereof;

altering the control ratio to a second constant control ratio upon the generation of said failure signal; and determining whether a defect resides in said heating unit or in said temperature sensor in dependence upon a comparison of the slopes of the measured actual temperature ($T_m(t \geq t_1)$) and the setpoint temperature ($T_s(t \geq t_1)$) characteristics after control ratio alteration at least one point or by a comparison of average slopes over a given time interval.

2. The method defined in claim 1 wherein said maximum permissible value is outside a theoretical or empirically determined range based upon at least one of a maximum permissible tolerance of a characteristic of the temperature sensor, a maximum permissible construction tolerance, and a permissible tolerance in mounting of said temperature sensor.

3. The method defined in claim 1 wherein at least upon an initial calibration of the heating device an actual value temperature is obtained which is within a predetermined tolerance of the setpoint temperature ($T_s(t_m)$) and generation of said failure signal indicates a need to replace said temperature sensor.

4. The method defined in claim 1 wherein the second constant control ratio is smaller than said first control ratio ($s_0$).

5. The method defined in claim 4 wherein said second constant control ratio is zero percent.

6. The method defined in claim 1 wherein (I) after a predetermined time interval ($\Delta t$) following the control ratio alteration measuring a second actual temperature value ($T_m(t_2)$) with said temperature sensor and forming the actual temperature difference $|\Delta T_{m12}| = T_m(t_m) - T_m(t_2)|$ between the first and second actual temperature values;

(II) the actual temperature difference $|\Delta T_{m12}|$ is compared with a theoretical or empirically determined setpoint difference ($|\Delta t_{s12}|$) corresponding to the difference between the corresponding temperature setpoints of the first control ratio and the setpoint after the predetermined time interval of the temperature setpoint value; and (III) upon the occurrence of an impermissibly high deviation between the actual difference and setpoint difference, a heating unit failure signal ($F_H$) or upon occurrence of a permissible or small deviation, a temperature sensor failure signal ($F_T$) is generated.

* * * * *